United States Patent [19]
Wang et al.

[11] Patent Number: 5,426,927
[45] Date of Patent: Jun. 27, 1995

[54] AUTOMATED FRUIT PICKER

[75] Inventors: Xingwu Wang, Alfred, N.Y.; Thomas C. Hardy, Lynn Haven, Fla.

[73] Assignee: Howard J. Greenwald, Penfield, N.Y.

[21] Appl. No.: 280,710

[22] Filed: Jul. 26, 1994

[51] Int. Cl.⁶ ............................................. A01D 45/00
[52] U.S. Cl. .................................................. 56/328.1
[58] Field of Search ................... 56/328.1, 329, 332, 56/335, 338

[56] References Cited

U.S. PATENT DOCUMENTS

| | | | |
|---|---|---|---|
| 4,519,193 | 5/1985 | Yoshida et al. | 56/328.1 |
| 4,975,016 | 12/1990 | Pellenc et al. | 56/328.1 |
| 5,220,775 | 6/1993 | Vogel et al. | 56/328.1 |

*Primary Examiner*—Michael Powell Buiz
*Attorney, Agent, or Firm*—Howard J. Greenwald

[57] ABSTRACT

An automated fruit picker with a base, a flexible arm containing two segments movably attached to each other, a cutting assembly attached to the flexible arm, and a controller for varying the angle between the arms and the height of the flexible arm. A cutting assembly is attached to one of the arm segments and contains a multiplicity of sensors for evaluating the color of the fruit to be picked, the location of the fruit, and the distance between the fruit and the cutting assembly.

15 Claims, 8 Drawing Sheets

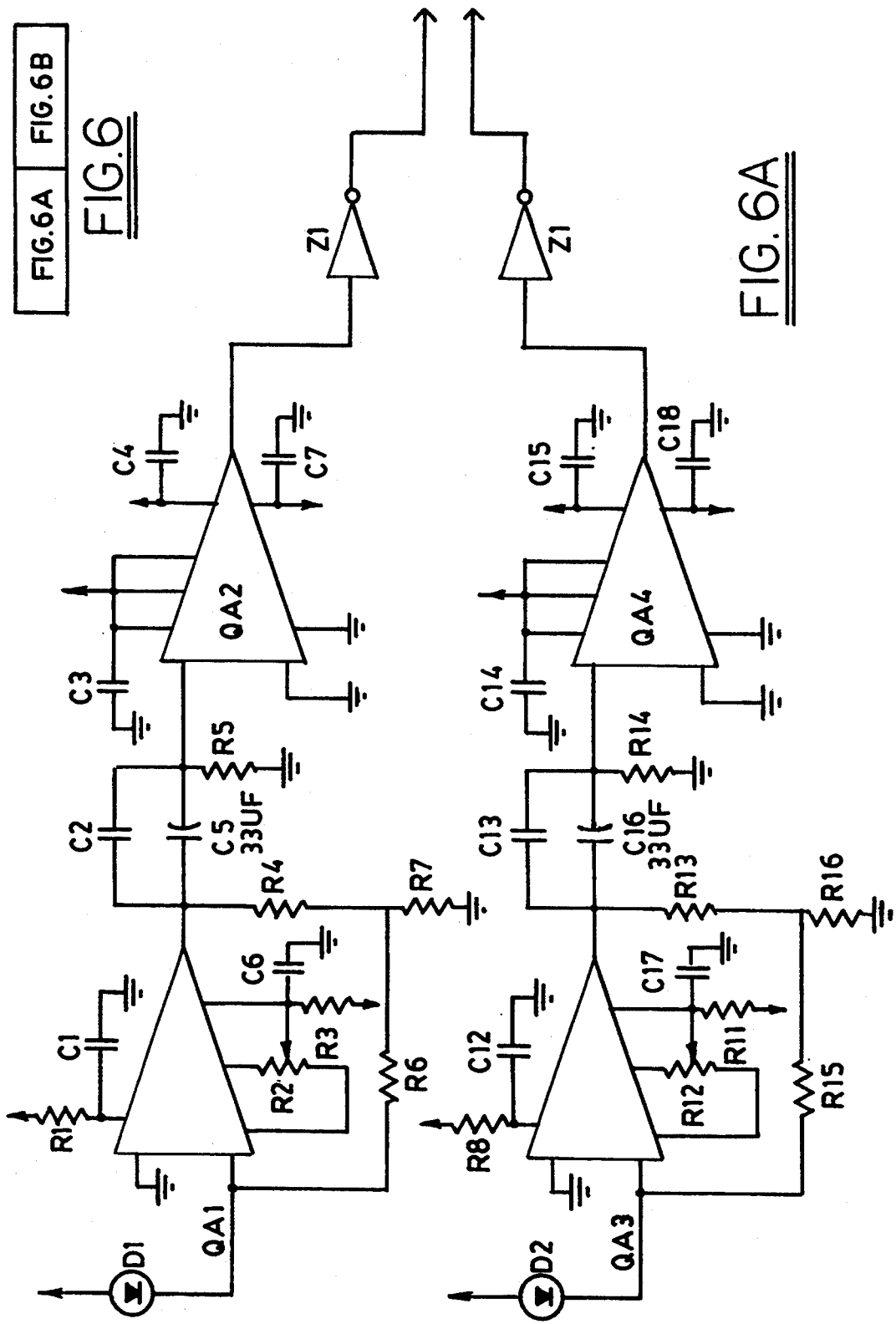

AUTOMATED FRUIT PICKER

FIELD OF THE INVENTION

An automated fruit picker for picking fruit from fruit trees.

BACKGROUND OF THE INVENTION

Manual fruit pickers for collecting fruit from fruit trees are well known to those skilled in the art. Thus, e.g., U.S. Pat. No. 4,928,461 discloses a picking head for a fruit bag adapted to be attached to the distal end of an elongated pole; it includes a cutting blade mounted on it so that a worker may extend the bag and picking head to an elevated position. Thus, e.g., U.S. Pat. No. 4,531,352 discloses a pole mounted fruit-picking device which contains a double ring jaw assembly mounted on the end of a pole; the bottom jaw is stationary and the upper ring has a cutting edge. The disclosure of each of these patents is hereby incorporated by reference into this specification.

The availability of inexpensive, manual labor for picking fruit has diminished in recent years; and, with the explosion of litigation and regulation in many areas of society, the use of such manual labor has grown substantially less desirable.

It is an object of this invention to provide an automatic fruit picker which can efficiently and automatically locate and pick fruit from fruit trees.

SUMMARY OF THE INVENTION

In accordance with this invention, there is provided an automated fruit picker comprised of a base, a control unit attached to the base, a first arm hingably attached to the base, a second arm hingably attached to the first arm, and a third arm hingably attached to the second arm. A cutting assembly is attached to the third arm. It contains a sensor for detecting the position of a fruit with a certain range of colors, a movable blade, and means for coordinating the movement of the arms and the blade to cut the fruit.

DESCRIPTION OF THE PREFERRED EMBODIMENT

Figure 1:
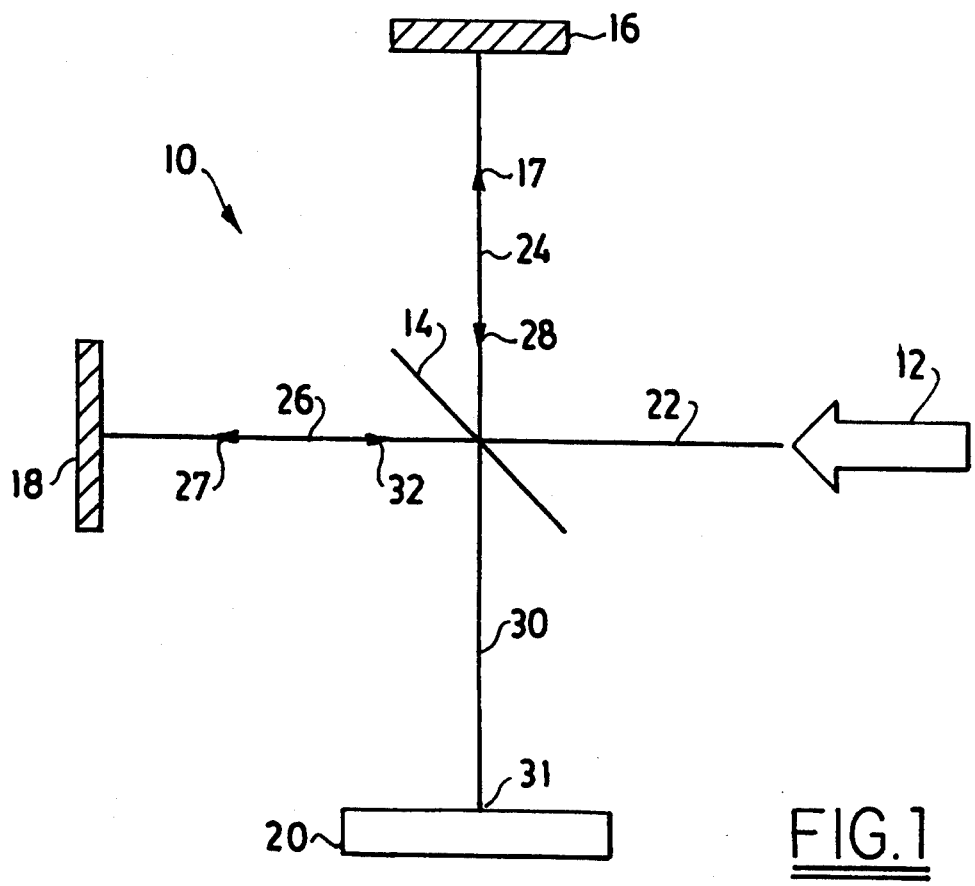
FIG. 1 is a schematic of a preferred laser detector which may be used in the apparatus of this invention.

The automated fruit picker of this invention is comprised of a multiplicity of sensors, some of which gauge distance between two bodies, or the relative movement between two bodies, One preferred laser detector which may (but need not) be used in such apparatus is described in the first portion of this specification, FIG. 1 is a schematic diagram of one preferred laser detector 10. Referring to FIG. 1, it will be seen that laser detector 10 is comprised of a means 12 for producing a laser beam, a laser beam splitter 14, a first reflector 16, a second reflector 18, and a digital signal processor 20.

Referring to FIG. 1, it will be seen that laser 12 produces a laser beam 22. Any conventional laser adapted to produce a coherent laser beam may be used as laser 12, Thus, referring to the Melles Griot "Optics Guide 5" (published by Melles Griot of 1770 Kettering Street, Irvine, Calif. in 1990), a helium neon laser (see pages 17-1 to 17-38) such as, e.g., a diode laser (see pages 20-1 to 20-72), and the like. In one preferred embodiment, a self-contained red helium—neon laser sold as catalog number 05 LLP 805 (see page 17-26 of the Melles Griot catalog) is used.

Referring again to FIG. 1, a beam splitter 14 is disposed in the path of laser beam 22. In general, beam splitter 14 may be located from about 1 to about 20 centimeters from laser 12.

The function of beam splitter 14 is to reflect a first portion 24 of beam 22 towards reflector 16 in the direction of arrow 17 while simultaneously transmitting a second portion 26 of beam 22 towards reflector 18 in the direction of arrow 27.

Beam splitters are well known to those skilled in the art and are readily commercially available. Thus, referring to the aforementioned Melles—Griot catalog, one may use plate beam splitters (see pages 13-4 to 13-7), high energy laser beam splitters (see pages 15-14 to 15—15), laser line non-polarizing beam splitters (see pages 20-71 to 20-72), cube beam splitters (see pages 13-9 to 13—13, 14-16, 14-17, and 20-66 to 20-70), and the like. As long as a portion of the laser beam is transmitted while another portion is reflected, the beam splitter may be used.

By way of further illustration, and not limitation, one may use the beam splitters described in U.S. Pat. Nos. 5,078,473, 5,073,879, 5,073,702, 5,071,251, etc. The entire disclosure of these patents is hereby incorporated by reference into this specification.

In one preferred embodiment, beam splitter 14 is a plate beam splitter comprised of glass a portion of which is coated with silver.

Depending upon the distance between each of reflectors 16 and 18 and beam splitter 14, and the reflectivity of each of reflectors 16 and 18, the amount of light transmitted to reflector 18 will be from about 10 to about 90 percent of the total amount of light flux present in beam 22.

Referring again to FIG. 1, it is preferred that each of reflectors 16 and 18 have a reflectivity of from about one percent to about 100 percent and, preferably, have a reflectivity of at least about 20 percent. In one preferred embodiment, the reflectivity of each of reflectors 16 and 18 is at least about 80 percent.

One may use any of the conventional reflectors which are readily commercially available. Thus, e.g., referring to the aforementioned Melles—Griot catalog, one may use flat mirrors (see page 12-11), square flat mirrors (see page 12—12), round flat mirrors (see page 12-13), laser diode mirrors (see page 12-14), spherical concave mirrors (see page 12-15), and the like.

Referring again to FIG. 1, it will be seen that the light reflected from reflector 16 will travel in the direction of arrow 28, and at least a portion of such light will travel along optical path 30 towards optical processor 20. Similarly, light reflected from reflector 18 will travel in the directions of arrows 32 and be reflected by beam splitter 14 along optical path 30 towards optical processor 20.

Figure 1A:
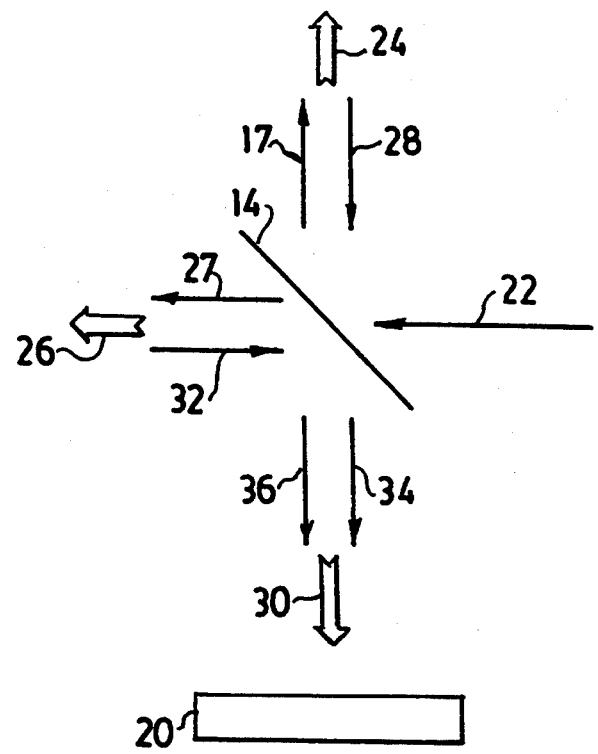
FIG. 1A is a schematic diagram of the optical paths traveled by the light beams in the device of FIG. 1.

FIG. 1A summarizes the light paths used in the device of FIG. 1. The initial light beam 22 is initially split into light beams 24 and 26 which travel along directions 17 and 27 and, after reflection travel back towards beam splitter 14 in the directions of arrows 28 and 32. A portion of the beam traveling along path 28 is transmitted through beam splitter 14 towards optical processor 20 in the direction of arrow 34, and a portion of the beam traveling along path 32 is reflected towards optical processor 20 in the direction of arrow 36.

Referring again to FIG. 1A, when the light beams traveling along light paths 34 and 36 are in phase, the resulting beam is deemed to be "constructive" and has a maximum intensity; see, e.g., pages 131-136 of J. Wilson et al.'s "Lasers: Principles and Applications," Prentice Hall, N.Y., 1987. However, when the light beams traveling along light paths 34 and 36 are 180 degrees out of phase, there will be a "destructive" composite beam produced, and the light intensity will be at a minimum. When the light beams are between 1 and 179 degrees out of phase, the light intensity will range from the maximum to the minimum.

Referring again to FIG. 1, and in the embodiment illustrated therein, each of reflectors 16 and 18 may be disposed at a 90 degree angle with regard to optical paths 24 and 26; and optical processor 20 may also be disposed at a 90 degree angle to optical path 30. As will be apparent to those skilled in the art, if either or both of reflectors 16 and/or 18 is tilted so that it is at an angle other than 90 degrees, or if optical processor 20 is tilted so that it is at an angle other than 90 degrees, there will be produced a diffuse pattern of light beams along optical path 30 which will show themselves as an interference fringe pattern on the receiving plane 31 of the optical processor 30; see, e.g., page 135 of the aforementioned J. Wilson text. Only when both reflectors 16 and 18 are disposed at exactly 90 degrees, and when receiving plane 31 of optical processor 30 is also disposed at exactly 90 degrees, does the interference fringe pattern appear as one spot.

The elements 12, 14, 16, 18, and 20, and their cooperation to produce interference fringe patterns, are both well known. See, e.g., U.S. Pat. Nos. 5,098,190, 5,076,689, 4,997,272, 4,991,963, and the like. The entire disclosure of each of these patents is hereby incorporated by reference into this specification.

The light beam(s) traveling along path 30 impact the receiving plane 31 of optical processor 20. One preferred embodiment of receiving plane 31 is illustrated in FIG. 2.

Figure 2:
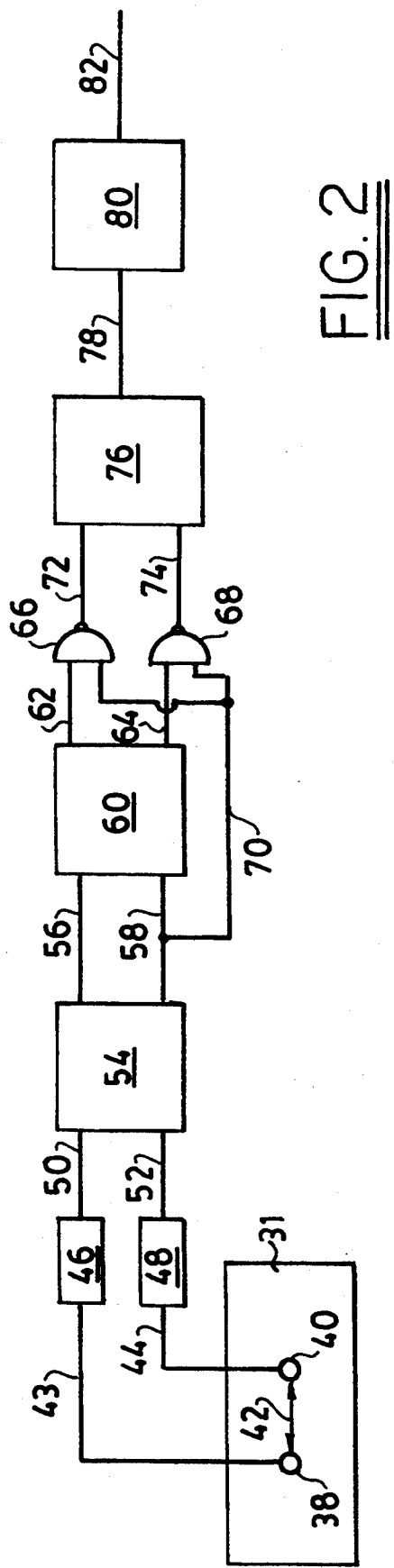
FIG. 2 is a block diagram of the preferred circuitry and logic used in the laser detector of FIG. 1.

Referring to FIG. 2, it will be seen that receiving plane 31 is comprised of a first optical sensor 38 and a second optical sensor 40, each of which is adapted to convert light energy into an electrical signal which will vary in intensity with the phase relationship between the beams traveling along arrows 34 and 36.

The optical sensors 38 and 40 are disposed at a distance 42 from each other of from about 0.5 millimeters to about 5.0 centimeters. It is preferred that distance 42 be from about 1 millimeter to about 10 millimeters. In one embodiment, sensors 38 and 40 are from about 1.5 to about 4 millimeters apart.

One may use conventional optical sensors, especially those which are comprised of one or more semiconductors. Thus, by way of illustration and not limitation, one may use the optical sensors described in U.S. Pat. Nos. 5,097,476, 5,005,085, 5,003,188, 4,996,573, 4,987,461, 4,926,231, and the like. The entire disclosure of each of these patents is hereby incorporated by reference into this specification.

Thus, by way of further illustration, one may use an HFD Series Photodiode/Operational Amplifier sold (as catalog number D3017A-2) by the EG&G Electro-Optics company of 35 Congress Street, Salem, Mass. Thus, e.g., one may use an SD113-2421-021 Bi-Cell which is sold by the Silicon Detector Corporation of 1240 Avenida Acasco, Camarillo, Calif. (see catalog No. 400-44-003, Revision C). The latter sensor, a "bi-cell," combines two light sensing diodes separated by a distance of 2 millimeters into one unit. Thus, by way of yet further illustration, one may use an SD-100-4X-XX-231 DETECTOR/PREAMP which is also sold by the Silicon Detector Corporation; see, e.g, catalog number 400-44-002, Revision D.

Referring again to FIGS. 1 and 1A, when mirror 18 (or another reflective object) is approached so that there is relative movement between it an object containing laser 12, the interference fringe formed on plane 31 of optical processor 20 also moves. As such interference fringe moves, then the intensity level sensed by sensor 38 and/or sensor 40 will vary. This variation in intensity level can be picked up and evaluated by the optical processor 20.

The variation in intensity level will be translated into electrical signals by optical sensors 38 and 40, each of which will pass such signals by separate lines (such as lines 43 and 44) to amplifiers 46 and 48. The amplified signals are then passed via lines 50 and 52 to a digitizer 54.

As will be apparent to those skilled in the art, the digitizer 54 converts each of the electrical inputs fed to it via lines 50 and 52 into a digital signal. In one preferred embodiment, digitizer 54 is a semiconductor device.

One may use any of the digitizers well known to those skilled in the art. Thus, e.g., one may use one or ore of the digitizers disclosed in U.S. Pat. Nos. 5,107,079, 5,103,466, 5,103,080, 5,093,843, 5,083,313, 5,081,297, and the like. The entire disclosure of each of these patents is hereby incorporated by reference into this specification. By way of further illustration, one may use any of the D/A converters disclosed on pages 237–242 of Rudolf F. Graf's "The Encyclopedia of Electronic Circuits," Tab Books Inc., Blue Ridge Summit, Pa. 1985.

In one preferred embodiment, a type 741 amplifier is used as the digitizer.

Referring again to FIG. 2, the digitized outputs from digitizer 54 are passed via lines 56 and 58 to flip flop circuit 60, in which the output of lines 56 and 58 is combined according to specified digital logic table. As is know to those skilled in the art, one output from flip/flop device 60, known as "Q", is provided to line 62. A second output from flip/flop device 60, which is the inverse of "Q" and is called "Q bar", is provided to line 64.

The Q/Q bar outputs from lines 62 and 64 are fed to NAND gates 66 and 68. Furthermore, a portion of the output from line 58 is also fed to line 70 and, thereafter, to NAND gate 66.

The NAND gates 66 combines the two separate signals fed to it and reverses the polarity of such signals; it feeds it output via line 72, which is referred to hereinafter as "up input," to digital counter 76. The output of line 74, which comes from NAND gate 68 and is referred to hereinafter as "down input", also is fed to counter 76.

The counter 76 will provide an output which will simulate the shape of the electrical waves originally generated by sensors 38 and 40, in a digital form. The ascending portion of such waves is provided by the up input; the descending portion of such waves is provided by the down input.

The simulated electrical wave signal will be provided by lines 78 a digital to analog converter 80, which will provide an electrical signal 82 which simulates the analog motion of reflector 18 (see FIG. 1). This electrical signal can be displayed by conventional means, such as an oscilloscope, or other graphics display, to accurately reflect the motion of reflector 18. When reflector 18 is attached to an object to be monitored, such as, e.g., a shaker (not shown) or a vibrating mechanical part (not shown), the motion of such object will be accurately described by such display.

In one embodiment, not shown, reflector 18 is the natural skin of the fruit to be picked.

Figure 3:
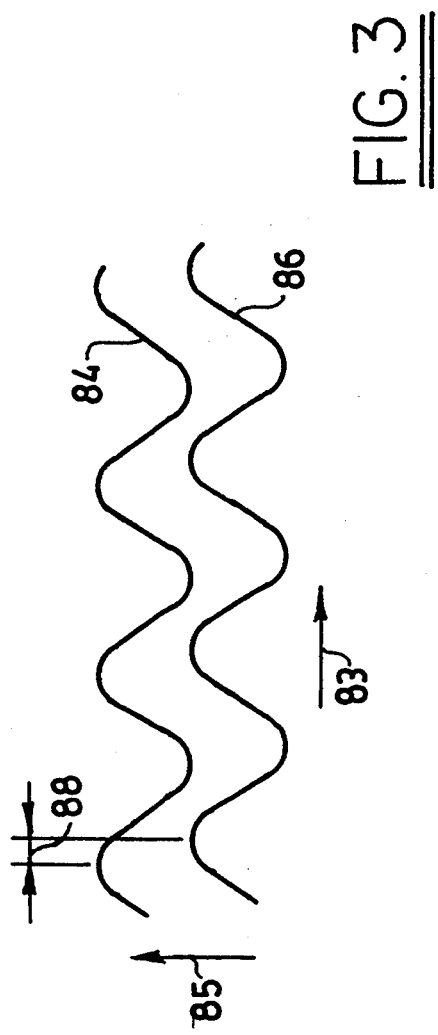
FIG. 3 is a graph illustrating how the outputs from the two optical detectors of the optical processor of FIG. 2 are out of phase with each other in one instance.

FIG. 3 is an illustrative graph of the electrical outputs 84 and 86, on which time is plotted in the direction of arrow 83 and amplitude is plotted in the direction of arrow 84; the wavelengths of these outputs corresponds to the wavelength of laser beam 22; land these outputs are fed from sensors 38 and 40 via lines 42 and 44. Referring to FIG. 3, it will be seen that sine wave output 84 leads sine wave output 86 by a time 88, and, thus, that these two outputs are out of phase.

As will be apparent to those skilled in the art, when the object to be viewed is moving away from beam splitter 14, a different, opposite, phase shift will be produced, and output 84 will lag output 86.

Figure 4:
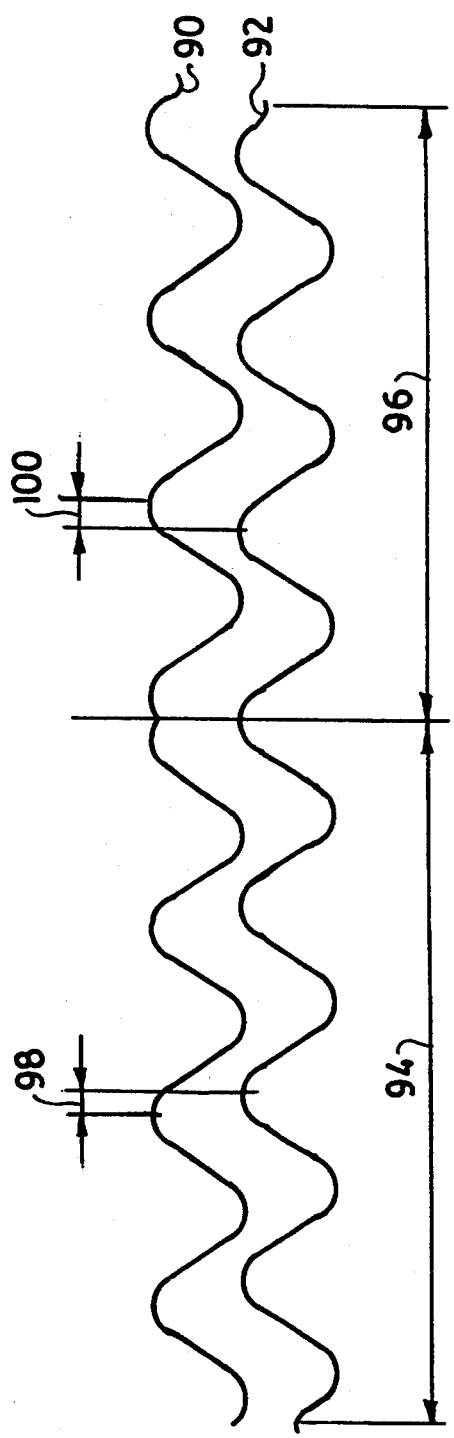
FIG. 4 is a graph illustrating the phase shifts which occur when the object being sensed is moving towards or away from the detector.

FIG. 4 presents an illustrative graph of the electrical output from sensors 38 and 40 when the object to be sensed is moved towards and away from in an oscillating, back-and-forth motion. Referring to FIG. 4, it will be seen that the electrical output 90 is produced from one of the sensors 38 or 40, and electrical output 92 is being produced by another of such sensors 38 and 40.

During time period 94, the "reflector 18" is being approached, and, in such a case, signal 90 leads signal 92 by time 98. During time period 96, the "reflector 18" is being moved away from, and, in this instance, signal 90 lags signal 92 by time 100.

Figure 5:
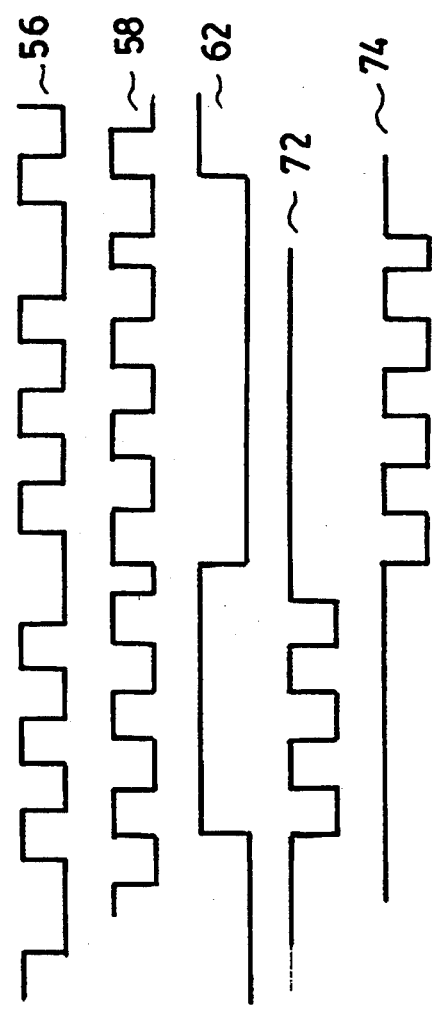
FIG. 5 is a graph of digitized wave forms produced from the data from the optical sensors.

FIG. 5 is a graph of illustrative outputs 62 (Q) and 64 (Q bar) from flip flop device 60 which corresponds to the outputs 90 and 92 of FIG. 4. As is true with FIG. 4, during the time 94, during which the reflector 18 is being approached, the output 62 is leading output 64. In this situation, only when both outputs are positive (1) will the Q be 1. Conversely, during the time 96, during which the "reflector 18" is being moved away from, the output 62 is lagging the output 64; in this situation, Q will always be 0, and Q bar will always be 1.

Referring again to FIG. 2, the Q bar so produced is combined with the output of line 58 and fed to NAND gate 68. The Q so produced is fed directly to NAND gate 66. The outputs from these NAND gates are signals 72 and 74 which, in turn, may be fed to counter 76 (see FIG. 2).

The signal 72 is fed to the up counter. The signal 74 is fed to the down counter. As indicated elsewhere in this specification, the up counter pulses are used to provide the ascending portions corresponding to one direction of movement, and the down counter pulses are used to provide the descending portions corresponding to the other direction of movement.

Figure 6B:
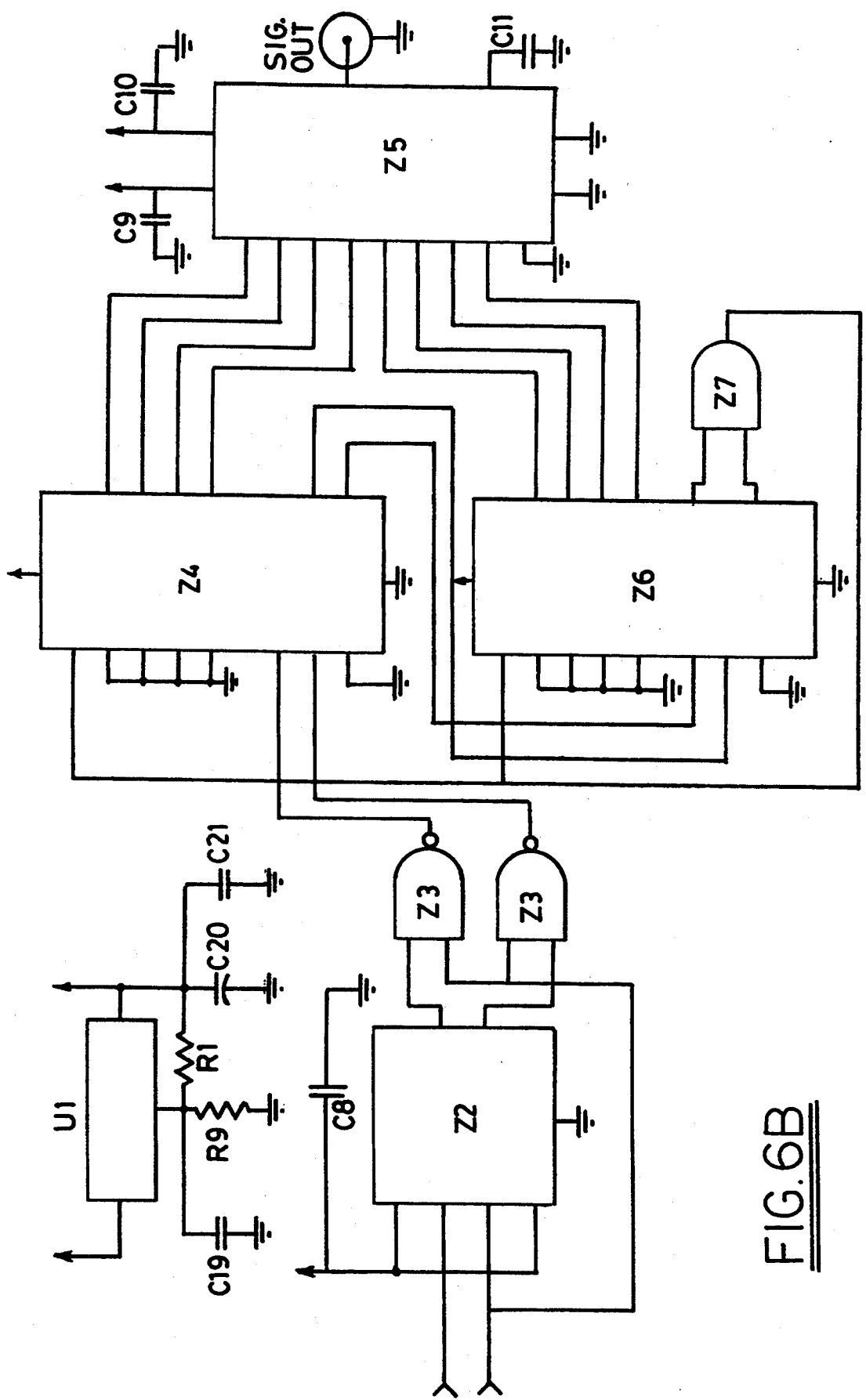
FIG. 6 is a schematic diagram of one preferred laser detector of the apparatus of this invention.

FIG. 6 is a schematic of a preferred laser detector. In the circuit of FIG. 6, all unlabeled capacitors are 1 microfarad, semiconductors QA1 and QA3 are LM5154, semiconductors QA2 and QA4 are LM361, semiconductor chip Z1 is a 7404 chip, semiconductor chip Z2 is a 7474 chip, semiconductor chip Z3 is a 7400 chip, semiconductor chips Z4 and Z6 are 74193 chips, semiconductor chip Z5 is a TDA8702 chip, semiconductor chip Z7 is a 7408 chip, and all unused inputs in semiconductor chips Z1, Z2, Z3, and Z7 are grounded.

The automated fruit-picking assembly

The fruit picking assembly of this invention utilizes a multiplicity of sensors to approach and cut the fruit. These sensors cooperate with mechanical structure.

Any of the mechanical structures used in the prior art to cut fruit may be advantageously employed with the sensor assembly of this invention.

Thus, by way of illustration, one may utilize a telescoping arm, a first hoop member fixed to the telescoping arm, a second hoop member attached to the telescoping arm, and a means for actuating the second hoop member relative to the first hoop member. This device is disclosed in U.S. Pat. No. 5,083,418. The entire disclosure of this patent is hereby incorporated by reference into this specification.

Thus, by way of further illustration, one may use a picking head containing a pair of C-shaped arms which are each independently pivotally suspended at their upper ends and also containing a reaction mass which forms the drive system and carries a pair of cranks which drive a pair of connecting rods connected to each of the C-shaped arms. This device is disclosed in U.S. Pat. No. 5,074,108. The entire disclosure of this patent is hereby incorporated by reference into this specification.

Thus, e.g., U.S. Pat. No. 5,005,347 discloses a fruit picking device which includes a head for receiving the fruit, a first pair of bails pivotally mounted to the head in spaced relation to each other across the housing opening, a second pair of bails pivotally mounted to the head in spaced relation to each other across the housing opening substantially perpendicularly to the first pair of bails, and cutter blades carried by the latter bails and effective, when the bails are pivoted to their closed positions, to engage and cut the stem of the fruit. The entire disclosure of this patent is hereby incorporated by reference into this specification.

By way of further illustration and not limitation, other suitable devices which may be used in the apparatus of this invention may be found, e.g., in U.S. Pat. Nos. 4,608,813, 4,226,075, 4,196,571, 4,154,048, 4,109,449, 4,102,376, 4,074,819, 4,006,581, 4,000,787, 3,987,608, 3,968,878, 3,953;960, 3,925,973, 3,902,306, 3,857,227, 3,854,273, 3,774,381, 3,744,226, 3,727,720, 3,633,336, 3,623,307, 3,590,565, 3,566,594, 3,559,387, 3,552,106, and the like. The disclosure of each of these United States patents is hereby incorporated by reference into this specification.

Figure 7:
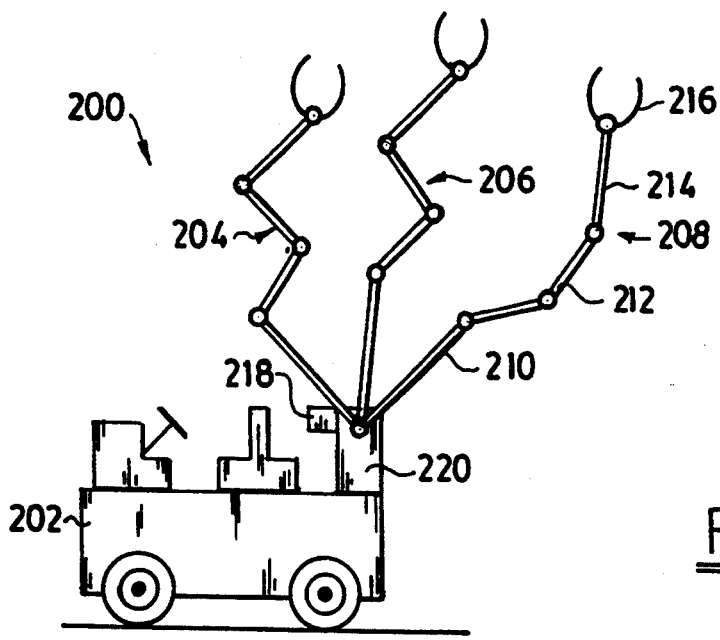
FIG. 7 is a schematic representation of one preferred embodiment of the automated fruit picker of this invention.

FIG. 7 is a schematic view of automated fruit picker 200 which, in the preferred embodiment depicted, is comprised of a movable base 202 and, attached thereto, arm assemblies 204, 206, and 208. Although three such arm assemblies are depicted in FIG. 7, it will be apparent to those skilled in the art that only one such arm assembly is essential.

Referring again to FIG. 7, it will be seen that arm assembly 208 is comprised of arm 210 and, hingably attached to it, arm 212. In turn, arm 212 is hingably attached to arm 214 which, in turn, is attached to the movable cutting assembly 216. The movements of the cutting assembly 216 and the arm assembly 208 (and of each of its components) are controlled by controller 218.

Referring again to FIG. 7, it will be seen that each of the arm assemblies 204, 206, and 208 are comprised of hollow arm units through which, by the force of gravity, fruit 224 (see FIG. 13) may fall. This feature is shown in greater detail in FIG. 13.

Figures 13, 14:
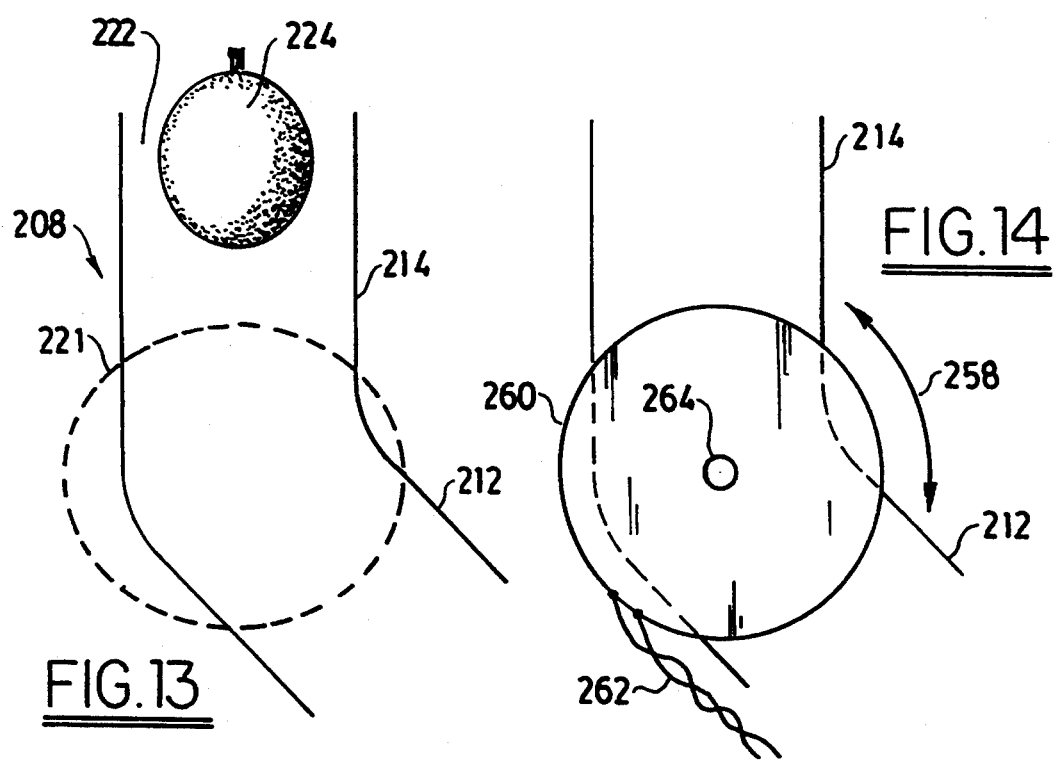
FIG. 13 is a sectional view of an air duct which may be incorporated into the assembly of FIG. 7.
FIG. 14 is a sectional view of one of the joints between two of the arms on the assembly of FIG. 7.

Referring to FIG. 13, which is a partial view of arm assembly 208, it will be seen that the arm assembly is comprised of a multiplicity of hollow arm units (such as arm units 212 and 214) joined together by hinge means 221. The interior cavity 222 within the arm units is large enough for the fruit 224 to fall therewithin.

Referring again to FIG. 1, the fruit 224 (not shown in FIG. 1) which falls through one of the arm assemblies is collected in collector bin 220.

Figures 8, 9, 10:
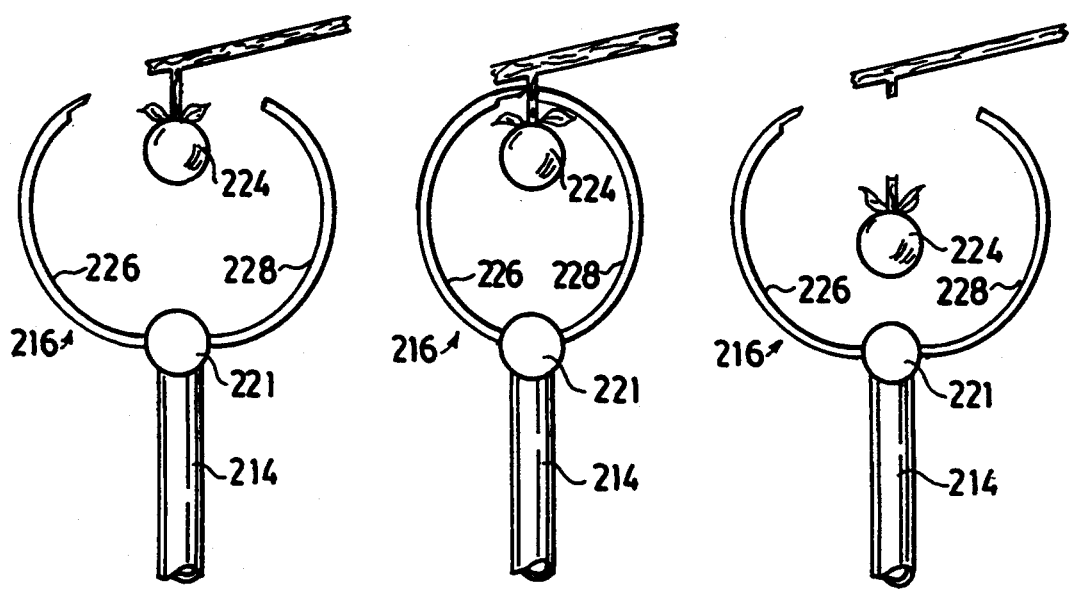
FIG. 8 is a partial sectional view of the cutting assembly of the fruit picker of FIG. 7, showing it approaching a fruit to be cut.
FIG. 9 is a partial sectional view of the cutting assembly of the fruit picker of FIG. 7, showing it cutting such fruit.
FIG. 10 is a partial sectional view of the cutting assembly of the fruit picker of FIG. 7, showing it having cut such fruit.

FIGS. 8, 9, and 10 are each sectional views of one preferred embodiment of cutting assembly 216, showing said assembly in different stages of the cutting process. Referring to FIG. 8, it will be seen that assembly 216 is comprised of a movable blade 226 movably attached to fixed blade 228.

Figure 11:
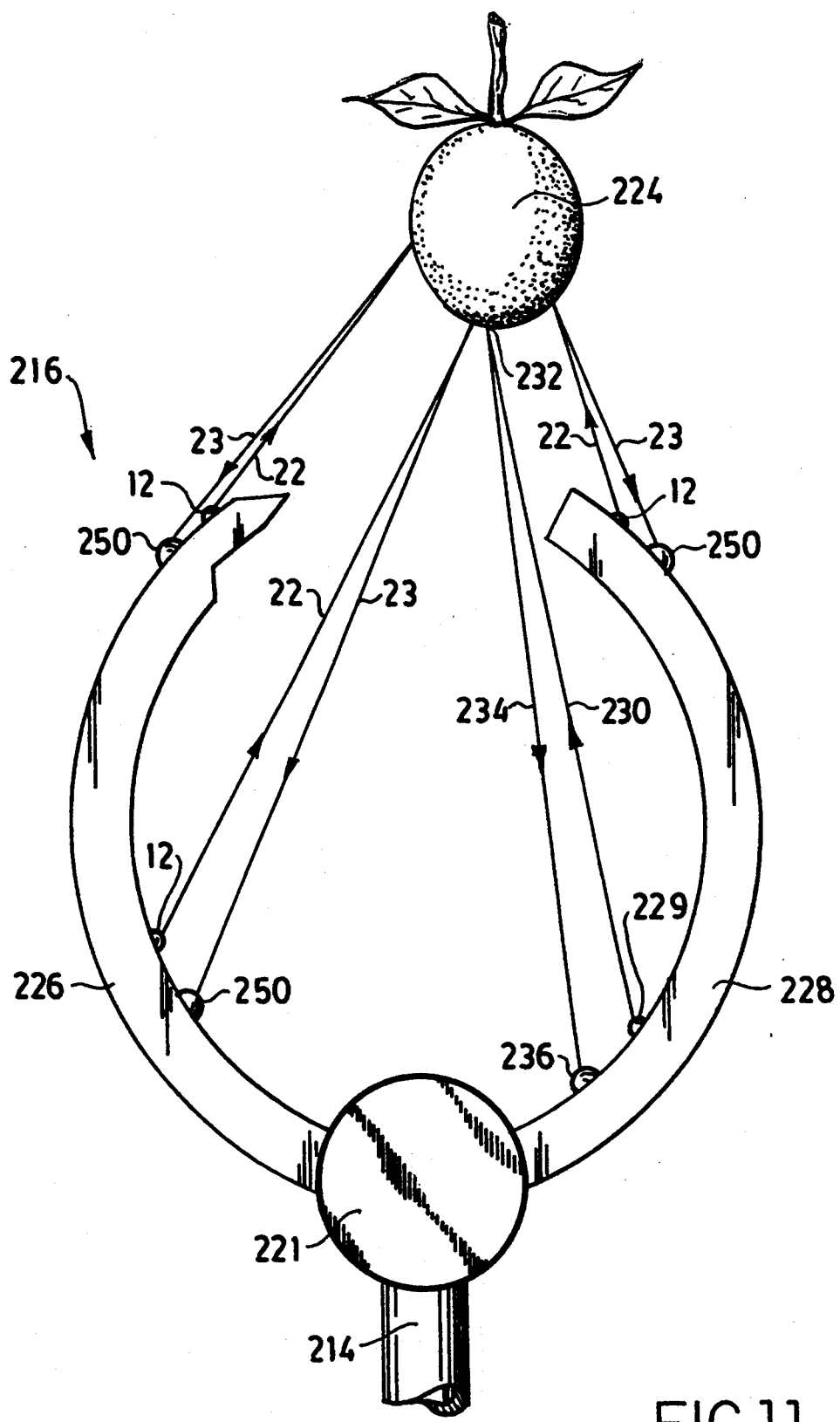
FIG. 11 is an enlarged sectional view of the cutting assembly of the fruit picker of FIG. 7, showing how the sensors on such cutting assembly gather data regarding such fruit.

FIG. 11 is a schematic diagram illustrating how blade assembly 216, in conjunction may be used to determine whether to cut fruit 224, and how to position itself to cut fruit 224.

As will be apparent to those skilled in the art, blade assembly 216 often will be moving towards or away from fruit 224. By the same token, because of the influence of vibration and/or wind, fruit 224 also may be moving. There is thus a need to accurately determine whether fruit 224 is worth picking and, if it is, how to precisely position cutting assembly 216.

Thus, referring to FIG. 11, and the embodiment depicted therein, light emitter 229 causes a ray of light 230 to impact fruit 224 at point 232 and reflect a ray of light 234 back to color sensor 236.

The function of color sensor 236 is to determine object 224 is, in fact, a fruit which assembly 216 wishes to cut. It evaluates the color of object 224 and, if it falls within a suitable range of the light spectrum, conveys such information to controller 218 (see FIG. 1) which then further activates the assembly.

Any suitable color sensor may be used as color sensor 236. Thus, by means of illustration and not limitation, one may use one or more of the color sensors described in U.S. Pat. Nos. 5,103,299, 5,101,266, 5,087,809, 5,086,197, 5,077,605, and the like. The entire disclosure of each of these United States patents is hereby incorporated by reference into this specification.

In addition to color sensor 236, the cutting assembly 216 also is preferably comprised of one or more sources of laser light 12 emitting a laser beam 22. The reflected laser beam 23 may then be evaluated by position sensor 250.

In the preferred embodiment illustrated, there are three position sensors 250, each of which is capable of determining the relative motion between the cutting assembly 216 and the fruit 224 and conveying this information to controller 218 so that it can precisely position the cutting assembly 216. It will be apparent that, although three such sensors 250 are depicted, one can use more or fewer. In general, however, it is preferred to use at least two of such sensors 250.

One or more of the sensors 250 may be the laser detector described in the first portion of this patent application. Alternatively, or additionally, other position sensors may be used.

Thus, by way of further illustration, one may use a conventional laser radar device for determining the relative positions of the cutting assembly 216 and the fruit 224. These laser radar assemblies are well known and are described, e.g., in U.S. Pat. Nos. 5,102,065, 5,086,396, 5,069,545, 5,047,782, 5,030,824, and 5,029,999.

Figure 12:
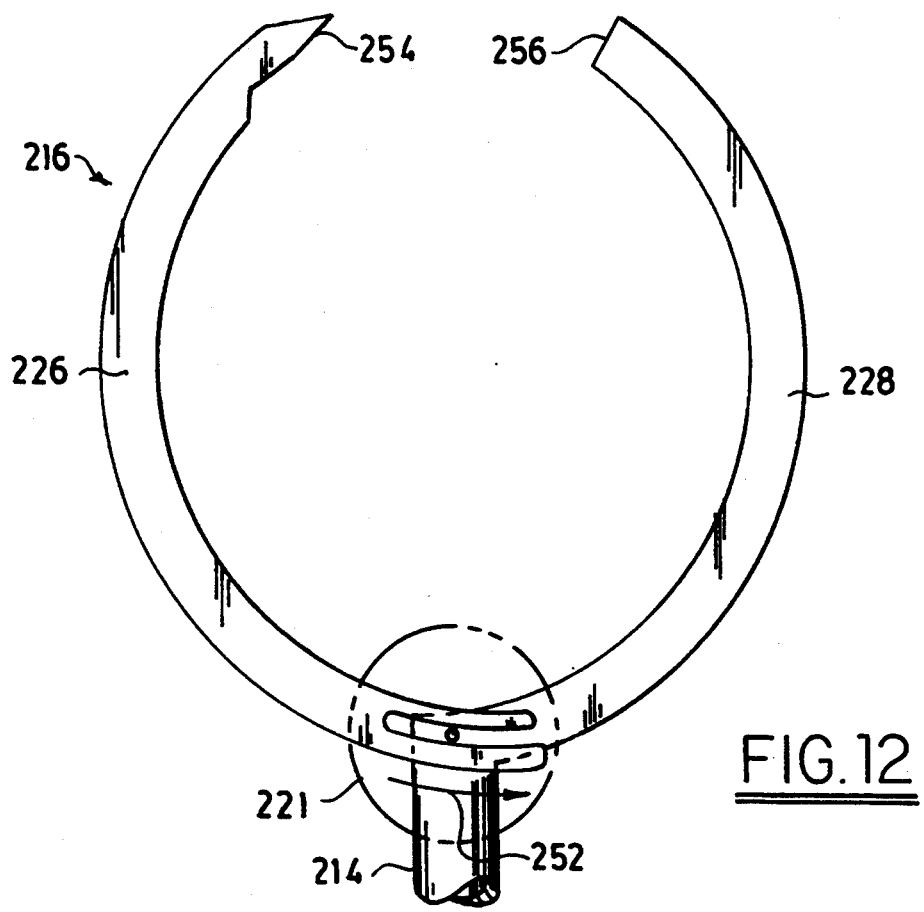
FIG. 12 is an enlarged sectional view of the assembly of FIG. 7, showing how one arcuate blade is movably mounted therein.

FIG. 12 is an enlarged sectional view of the cutting assembly blades 226 and 228 (which are not drawn to scale) illustrating how blade 226 is movably mounted on blade 228. As will be apparent to those skilled in the art, when blade 226 is moved in an arcuate path in the direction of arrow 252, the height of blade 226 will decrease and the distance of its tip 254 from the end 256 of stationary blade 228 will increase.

As will be apparent to those skilled in the art, many other means are available for effecting the relative movement of blade 226 and/or blade 228 to increase or decrease the height of such blade or the distance between such blades. Many of these prior art means are described in one more of the patents listed elsewhere in this specification. The precise configuration of the movable blade assembly is not critical to applicants' invention, but the use of a multiplicity of sensors to locate and cut a particular fruit with a particular color is.

In general, the blade assembly used in applicants' device will contain (1) a means of moving at least one of the blades towards the other, (2) a means of moving at least one of the blades away from the other, (3) a means of positioning the blade so that it will harvest the fruit, and (4) a means of causing the fruit to drop into some collection means.

FIG. 13 illustrates one such collection means, which is discussed elsewhere in this specification.

FIG. 14 illustrates a means for varying the angle 258 formed between arms 212 and 214. In the particular embodiment illustrated in FIG. 14, it will be seen that stepper motor assembly 260 which is operatively connected to controller 218 (not shown in FIG. 14, but see FIG. 7) by electrical leads 62 may be used to change not only angle 258 but also the elevation of arm 214. Point 264 is the geometrical center of stepper motor assembly 260. As will be apparent to those skilled in the art, stepper motor assembly 260 is comprised of a gear system to allow the accurate and incremental adjustment of angle 258.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An automated fruit picker comprised of a base, a flexible arm comprised of a first arm segment and a second arm segment attached to said base, a cutting assembly attached to said flexible arm, a control unit operatively connected to said flexible arm and to said cutting assembly, means for varying the angle formed between said first arm segment and said second arm segment, and means for varying the height of said flexible arm, wherein said cutting assembly is comprised of a movable blade, a first optical assembly for determining the color of said fruit, a second optical assembly for determining the location of said fruit, and a third optical assembly for determining the distance between said fruit and said cutting assembly.

2. The automated fruit picker as recited in claim 1, wherein said second optical assembly is comprised of a laser detector.

3. The automated fruit picker as recited in claim 2, wherein said laser detector is comprised of:
   (a) means for producing a first laser beam;
   (b) a laser beam splitter disposed in front of said means for producing a first laser beam;
   (c) a reflector;
   (d) an optical processor comprised of a top face, a first optical sensor disposed on said top face, and a second optical sensor disposed on said top face, wherein said first optical sensor and said second optical sensor separated from each other by a distance of from about 0.5 millimeters to about 5.0 centimeters;
   (f) means for amplifying an electrical signal;
   (g) means for digitizing an electrical signal;
   (h) flip flop means for combining a first digitized signal and a said second digitized signal into a Q signal and a Q bar signal;
   (i) means for combining said Q signal with said a digitized signal, thereby producing a first input signal;
   (j) means for combining said Q bar signal with a digitized signal, thereby producing a second input signal;
   (k) a counter for counting said first input signal and said second input signal and for producing a digital sequence based upon such counting.

4. The automated fruit picker as recited in claim 3, wherein said reflector is comprised of a mirrored surface.

5. The automated fruit picker as recited in claim 4, wherein said means for producing a first laser beam is a helium—neon laser.

6. The automated fruit picker as recited in claim 5, wherein said reflector is reflective tape.

7. The automated fruit picker as recited in claim 6, wherein said first optical sensor is silicon semiconductor.

8. The automated fruit picker as recited in claim 7, wherein said second optical sensor is a silicon semiconductor.

9. The automated fruit picker as recited in claim 8, wherein said laser detector is comprised of a first digitizer and a second digitizer.

10. The automated fruit picker as recited in claim 9, wherein each of said first digitizer and said second digitizer is an operational amplifier.

11. The automated fruit picker as recited in claim 10, wherein said operational amplifier converts analog signals to digital signals.

12. The automated fruit picker as recited in claim 11, wherein said laser detector is comprised of a flip-flop circuit.

13. The automated fruit picker as recited in claim 12, wherein said laser detector is comprised of a first counter.

14. The automated fruit picker as recited in claim 13, wherein said laser detector is comprised of a second counter.

15. The automated fruit picker as recited in claim 14, wherein said laser detector is comprised of a display.

* * * * *